UNITED STATES PATENT OFFICE.

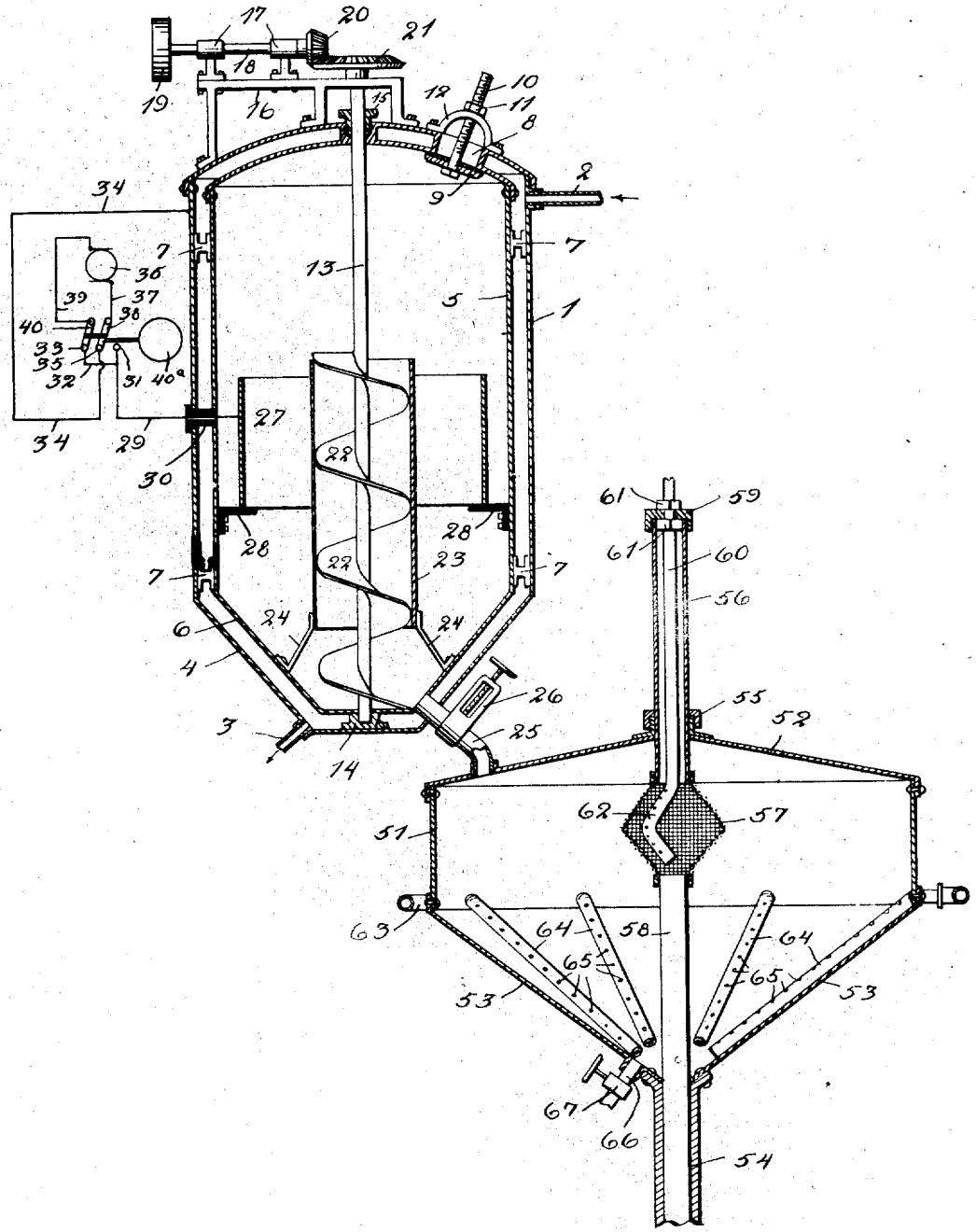

CHARLES S. HELLER, OF AKRON, OHIO, ASSIGNOR TO MOORE ARCHITECTURAL AND ENGINEERING COMPANY, OF AKRON, OHIO, A CORPORATION OF OHIO.

PROCESS FOR RECLAIMING VULCANIZED-RUBBER WASTE.

1,024,937.  Specification of Letters Patent.  Patented Apr. 30, 1912.

Application filed June 22, 1911. Serial No. 634,738.

*To all whom it may concern:*

Be it known that I, CHARLES S. HELLER, a citizen of the United States, residing at Akron, in the county of Summit and State of Ohio, have invented certain new and useful Improvements in Processes for Reclaiming Vulcanized-Rubber Waste, of which the following is a specification.

This invention relates to a novel process for reclaiming rubber waste and has particular reference to certain new and useful improvements in the process patented by me under date of December 13, 1910, in Patent No. 978,584.

An important object of this invention is to provide means whereby the reclaiming of rubber waste and solution are then agitated tious, thorough and continuous, and carried on at a smaller cost than has heretofore been done.

In my process disclosed in Patent No. 978,584, the rubber waste together with a solution containing caustic alkali and ferric sulfate is placed in a closed receptacle and there subjected to pressure and heat. The rubber waste and solution are then agitated and subjected to the action of an electric current. After the rubber waste has been thus treated with the reclaiming agents, the entire mass is thoroughly washed to remove all traces of the reclaiming agents from the rubber.

The present process differs from my patented process by the employment of a different solution containing the reclaiming agents. In the present process I preferably employ a solution containing six hundred pounds of water to one hundred pounds of comminuted rubber waste, thirty pounds by weight of caustic alkali—such as sodium hydrate or potassium hydrate—and one-half pound by weight of ferric hydroxid. This solution with which the rubber waste is mixed, is agitated in a closed receptacle and subjected to pressure and heat. The mass is subjected to the action of an electric current and the direction of flow of the current is frequently and preferably periodically reversed.

I will now proceed to explain the apparatus within which my process may be advantageously carried out.

In the accompanying drawing forming a part of this specification, the figure is a central vertical sectional view through the apparatus.

In the drawing wherein is illustrated a preferred embodiment of my invention, the numeral 1 designates a closed outer shell or casing, preferably of sheet metal, provided near its upper end with a steam inlet pipe 2 and at its lower end with a drip pipe 3. The outer shell 1 has a lower portion 4, which tapers downwardly in inverted frusto-conical shape, as shown. Disposed concentrically within the outer shell 1 is an inner shell, or casing 5, preferably of sheet metal (vertically disposed therein) and of smaller dimensions, to provide a steam chamber or jacket entirely surrounding the shell 5, as shown. The shell 5 is closed at its lower end by an inverted frusto-conical portion 6. The shells 1 and 5 are kept in their proper concentric positions by a suitable number of spacing members or ribs 7. Access is had to the interior of the shell 5 through an opening 8 formed through the upper end thereof, which opening is normally closed by a door 9, held in place by a screw-threaded pin 10, the upper screw-threaded portion of which engages a bracket 12 and carries a nut 11.

Disposed axially within the shell 5 is a vertical rotatable shaft 13, the lower end of which extends through an opening formed in the lower portion 6 of the shell 5 and is journaled in a stationary bearing 14. The upper portion of this shaft is journaled through a stuffing box 15. Rigidly mounted upon the upper end of the outer shell 1 is a horizontal support or bracket 16, upon which is rigidly mounted bearings 17, through which is journaled a horizontal rotatable shaft 18, carrying a fast pulley 19 at its outer end and a bevel-gear 20 at its inner end. This bevel-gear engages a larger bevel-gear 21, which is rigidly connected with the upper end of the shaft 13. Suitable means (not shown) are provided for rotating the pulley 19. The shaft 13 carries upon its lower half a spiral conveyer 22, extending downwardly to operate adjacent the bottom wall of the portion 6 of the inner shell. Surrounding the greater portion of the spiral conveyer 22 and spaced from the portion 6 is an open-ended cylinder or shell 23, which is held in its position by spaced stationary legs 24 attached to the lower end of the shell 23 and the portion 6. A discharge pipe 25 leads into the portion 6 of the inner shell adjacent the lower end of the spiral conveyer 22, and is provided with a cut-off valve 26.

Disposed within the shell 5 and intermediate the ends thereof is a zinc cylinder 27, surrounding the cylinder 23 and disposed in spaced concentric relation thereto. This cylinder 27 is insulated from the inner shell 5 and is supported by brackets 28 formed of insulating material. A wire 29 is connected with the cylinder 27 and is insulated from the shells 1 and 5 by a bushing 30 formed of fiber or other suitable insulating material. The wire 29 is connected with a fixed contact 31 and is also connected with a wire 32 having connection with a fixed contact 33. A lead wire 34 connected with a fixed contact 35, disposed between the contacts 31 and 33, is electrically connected with the outer metal shell 1 and hence electrically connected with the inner metal shell 5.

The numeral 36 designates a source of electrical current, as for example, a direct current dynamo of any well known or preferred type. One pole of the dynamo is connected with a wire 37 which is connected with a swinging arm 38 of a switch or pole changer. The other pole of the dynamo is connected with a wire 39 having connection with a swinging contact arm 40 of the switch or pole changer. The arms 38 and 40 are connected so that they move together. Means are provided for periodically throwing the switch. This means may be of any desired form or construction. Satisfactory results are obtained by the use of spring wound clock mechanism 40ª, set or adjusted to throw the switch as often as desired, preferably about once every five minutes. From the description of the above referred to parts, it is obvious that the cylinder 27 and the shell 4 serve as electrodes, for subjecting the reclaiming solution and rubber waste to the action of an electric current. By swinging the contact arms 38 and 40 to the right, contact arm 38 will engage the fixed contact 31 and contact arm 40 will engage contact 35, whereby the clyinder 27 and the shell 5 will be connected with the opposite poles of the source of current, or in other words the polarity of the electrodes is reversed.

Connected with the lower end of the pipe 25 and in open communication therewith is a cleansing tank having a cylindrical medial portion 51, a conically-formed cover 52, and an inverted conically formed bottom 53, the latter terminating in a discharge pipe 54 secured to the latter at the apex thereof. The cover 52 is provided with a stuffing box 55 at its apex to receive a vertically shiftable upwardly extending pipe 56 having secured to the lower end thereof a drum-shaped member 57 formed of wire-cloth from which depends a drain-tube 58 extending into and telescoping the pipe 54. Mounted on the upper end of the pipe 56 is a cap 59 provided with an aperture through which extends a tube 60 held in position by nuts 61 placed above and below the cap 59. The pipe 60 extends downwardly into the member 57 and terminates in a bent nozzle 62 provided with a plurality of minute openings. This nozzle conforms generally in shape with the side walls of the member 57 and is arranged to be revolved with the pipe 60 as an axle within the member 57. Surrounding the cylindrical portion 51 of the cleansing tank is a steam pipe 63 from which extends inwardly through the wall 51 of the tank, a plurality of steam pipes 64. These pipes are preferably arranged radially to the cleaning tank and lie on the bottom 53 thereof and each is provided with a plurality of openings 65. The bottom 63 is provided near its apex with a discharge pipe 66 closed by a gate valve 67.

In carrying out my process, a sufficient quantity of the reclaiming solution and comminuted rubber waste is introduced into the inner shell 5 to completely cover the spiral conveyer 22 and the cylinder 27. The pulley 19 is rotated so that the spiral conveyer will conduct material from the lower end of the shell 5 through the cylinder 23 and discharge such material from the upper end of the cylinder 23. It is thus seen that the reclaiming solution and comminuted rubber waste is constantly agitated. The reclaiming solution which I preferably use comprises for each one hundred pounds by weight of comminuted rubber waste, six hundred pounds by weight of water, thirty pounds by weight of caustic alkali, such as sodium hydrate or potassium hydrate, and one-half pound by weight of ferric hydroxid. This reclaiming solution in the shell 5 is kept constantly heated by live steam introduced into the steam chamber between the shells 1 and 5 from the pipe 2. I have found that the best results may be obtained by keeping the contents in the shell 5 at a temperature of from 330° to 370° F., preferably about 360° F., which temperature is obtained by introducing steam into the steam chamber at a pressure of from ninety-five to one-hundred-sixty pounds. The contents of the shell 5 are kept under pressure by the heated condition of said contents. During the agitation, the reclaiming solution and the comminuted rubber waste are continuously brought into immediate contact with the cylinder 27 and the shell 5. In its movement with the reclaiming solution, the rubber waste in passing between the cylinder 27 and the wall of the shell 5, is subjected to the action of the electric current generated by the dynamo 36.

It has been found by experience that the greater portion of rubber waste subjected to the action of the reclaiming process, carries a large percentage of mineral matter, including sulfur, and that the action of an electric current in passing through the solution assists in removing the mineral matters contained therein. I have found that the action of the reclaiming solution on the rubber waste is made much more effective by periodically changing the polarity of the electrodes, which may be accomplished by the proper operation of the switch, preferably by automatic means. The sulfur which is removed from the rubber waste is, through the influence of the chemical solution in which it is contained, and through the influence of the electrolytic action of the current, converted into a soluble combination which is carried away in solution. Without going into detailed description of the particular electrolytic action of the current passed through the solution and acting upon the rubber waste, it may be stated that unusually satisfactory results have been obtained by the use of an electric current, as herein described in the elimination of the deleterious matters carried by the rubber, notably those which have been incorporated therewith previous to the vulcanization of the rubber and the removal of which places the rubber as nearly as possible in its original gummy condition. By sending the current through the reclaiming solution in one direction and then through such solution in a reverse direction, the above described effect of the current is effective and complete and hence gives better results.

After the above described process has been carried out, the reclaiming solution and the rubber waste are discharged through the pipe 25 into the cleansing receptacle by proper manipulation of the valve 26. The cleansing tank will preferably be partially filled with pure hot water to remove as far as possible the chemicals used for reclaiming the rubber and separating the deleterious matters therefrom. In order to increase the effectiveness of the water in the cleansing tank live steam is turned into the annular pipe 63 from whence it passes to the pipes 64 and escapes by the orifices 65, the function of the steam jets from the pipes being to keep the solution contained in the cleansing tank in constant ebullition. After the cleansing process has been carried on for a sufficient length of time, the pipe 56, member 57 and pipe 58 are lowered sufficiently to cause the member 57 to be submerged in the solution which passes into the member 57 through the wire screen of which it is composed and escapes by means of the pipe 58, leaving the comminuted rubber within the cleansing tank. After the major portion of the liquid has been removed by the member 57 the latter is again raised and fresh water turned into the pipe 60 from whence it escapes through the orifices in the nozzle 62. At the same time the nozzle is rotated to cause the jets of water projected thereby to pass through the wire screen body of the member 57 and clean the latter. After a sufficient quantity of water has been placed in the tank, steam is again turned into the same through the pipes 64 and the cleansing process renewed and this is repeated until all of the solution employed for reclaiming rubber has been removed from the comminuted rubber waste, after which and preferably while there is a considerable body of water in the cleansing tank, the gate 67 is opened and the water and comminuted rubber particles are permitted to escape by the discharge pipe 66 onto suitable screens, after which the rubber waste is dried and is ready for use.

I have found that the best results are obtained by employing an electric current of four and six tenths volts and from seven hundred to one thousand amperes in strength, and changing the direction of current flow from sixty times a minute to six times per hour, preferably about twelve times per hour.

I wish it understood that the form of my invention herewith shown and described is to be taken as a preferred example of the same and that certain changes may be made therein without departing from the spirit of the invention or the scope of the subjoined claims.

Having thus described my invention, I claim:—

1. The herein described process of reclaiming vulcanized rubber waste, which consists in subjecting the vulcanized rubber waste to the action of a solution containing caustic alkali, subjecting the mass to the action of an electric current by sending the current through the mass in one direction and then in a reverse direction, and washing the rubber waste to remove the solution therefrom.

2. The herein described process of reclaiming vulcanized rubber waste, which consists in subjecting the vulcanized rubber waste to the action of a reclaiming solution containing caustic alkali and ferric hydroxid, subjecting the mass to the action of an electric current by sending the current through the mass in one direction and then through the same in a reverse direction, and treating the rubber waste to remove all traces of the reclaiming solution therefrom.

3. The herein described process of reclaiming vulcanized rubber waste, which consists in subjecting the vulcanized rubber waste to the action of a reclaiming solution containing caustic alkali and ferric hydroxid in the presence of heat and under pressure, subjecting the mass to the action of an electric current by placing electrodes in contact with the mass and changing the polarity of said electrodes, and washing said rubber waste to remove the reclaiming solution from the same.

4. The herein described process of reclaiming vulcanized rubber waste, which consists in subjecting the vulcanized rubber waste to the action of a reclaiming solution containing caustic alkali and a compound of iron, agitating the mass in the presence of heat and under pressure, subjecting the mass to the action of an electric current by sending the current through the mass in one direction and then in a reverse direction, and washing the rubber waste to remove the reclaiming solution therefrom.

5. The herein described process of reclaiming vulcanized rubber waste, which consists in subjecting the vulcanized rubber waste to the action of a reclaiming solution containing caustic alkali, agitating the mass in the presence of heat and under pressure, subjecting the mass to the action of an electric current by sending the current through the mass in one direction and then through the same in a reverse direction, and treating the rubber waste to remove all trace of the reclaiming solution.

6. The herein described process of reclaiming vulcanized rubber waste, which consists in subjecting the vulcanized rubber waste to the action of a reclaiming solution containing caustic alkali and ferric hydroxid, agitating the mass in the presence of heat and under pressure, simultaneously subjecting the mass to the action of an electric current by sending the current through the mass in one direction and then through the same in a reverse direction, and washing the rubber waste to remove all trace of the reclaiming solution therefrom.

7. The herein described process of reclaiming vulcanized rubber waste, which consists in placing vulcanized rubber waste together with a reclaiming solution containing caustic alkali and ferric hydroxid in a closed receptacle provided with electrodes, changing the polarity of the electrodes, heating the receptacle containing the mass, and withdrawing the mass and washing the vulcanized rubber waste to remove the reclaiming solution from the same.

8. The herein described process of reclaiming rubber waste, which consists in subjecting the rubber waste to the action of a reclaiming solution containing caustic alkali and ferric hydroxid, subjecting the mass to the action of an electric current having its direction of flow periodically reversed, and washing the rubber waste to remove the solution therefrom.

9. The herein described process of reclaiming rubber waste, which consists in subjecting the rubber waste to the action of a reclaiming solution containing caustic alkali, subjecting the mass to the action of an electric current having its direction of flow periodically reversed, and washing the rubber waste to remove the solution therefrom.

10. The herein described process of reclaiming rubber waste, which consists in subjecting the rubber waste to the action of a solution containing caustic alkali and ferric hydroxid, subjecting the mass to heat and agitating the same, subjecting said mass to the action of an electric current having its direction of flow periodically reversed, and washing the rubber waste to remove the solution therefrom.

11. The herein described process of reclaiming rubber waste, which consists in subjecting the rubber waste to the action of a solution containing caustic alkali and a heavy metal hydroxid, subjecting the mass to heat and agitating the same, subjecting said mass to the action of an electric current having its direction of flow periodically reversed, and washing the rubber waste to remove the solution therefrom.

12. The herein described process of reclaiming rubber waste, which consists in subjecting the rubber waste to the action of a solution containing caustic alkali and a heavy metal compound, subjecting the mass to the action of an electric current having its direction of flow periodically reversed, and washing the rubber waste to remove the solution therefrom.

13. The herein described process of reclaiming rubber waste, which consists in subjecting the rubber waste to the action of a solution containing caustic alkali and ferric hydroxid, agitating the mass in the presence of heat, subjecting the mass to the action of an electric current having its direction of flow periodically reversed, and washing the rubber waste to remove all traces of said solution from the same.

14. The herein described process of reclaiming rubber waste, which consists in subjecting the rubber waste to the action of a solution containing caustic alkali and ferric hydroxid, agitating the mass in the presence of heat and under pressure, subjecting the mass to the action of an electric current having its direction of flow frequently reversed, and washing the rubber waste to remove all traces of said solution.

15. The herein described process of reclaiming vulcanized rubber waste, which consists in subjecting the rubber waste to the action of a reclaiming solution in the presence of heat, subjecting the mass to the action of an electric current having its direction of flow frequently reversed, and treating the rubber waste to remove the reclaiming solution therefrom.

In testimony whereof I affix my signature in presence of two witnesses.

CHARLES S. HELLER.

Witnesses:
JOHN C. FRANK,
ETHEL F. CROY.

Correction in Letters Patent No. 1,024,937.

It is hereby certified that in Letters Patent No. 1,024,937, granted April 30, 1912, upon the application of Charles S. Heller, of Akron, Ohio, for an improvement in "Processes for Reclaiming Vulcanized-Rubber Waste," an error appears in the printed specification requiring correction as follows: Page 1, line 17, strike out the words "and solution are then agitated" and insert the words and syllables *may be rendered more expedi-;* and that the said Letters Patent should be read with this correction therein that the same may conform to the record of the case in the Patent Office.

Signed and sealed this 21st day of May, A. D., 1912.

[SEAL.]

C. C. BILLINGS,
*Acting Commissioner of Patents.* consists in subjecting the rubber waste to the action of a reclaiming solution in the presence of heat, subjecting the mass to the action of an electric current having its direction of flow frequently reversed, and treating the rubber waste to remove the reclaiming solution therefrom.

In testimony whereof I affix my signature in presence of two witnesses.

CHARLES S. HELLER.

Witnesses:
JOHN C. FRANK,
ETHEL F. CROY.

---

Correction in Letters Patent No. 1,024,937.

It is hereby certified that in Letters Patent No. 1,024,937, granted April 30, 1912, upon the application of Charles S. Heller, of Akron, Ohio, for an improvement in "Processes for Reclaiming Vulcanized-Rubber Waste," an error appears in the printed specification requiring correction as follows: Page 1, line 17, strike out the words "and solution are then agitated" and insert the words and syllables *may be rendered more expedi-;* and that the said Letters Patent should be read with this correction therein that the same may conform to the record of the case in the Patent Office.

Signed and sealed this 21st day of May, A. D., 1912.

[SEAL.]

C. C. BILLINGS,

*Acting Commissioner of Patents.*

Correction in Letters Patent No. 1,024,937.

It is hereby certified that in Letters Patent No. 1,024,937, granted April 30, 1912, upon the application of Charles S. Heller, of Akron, Ohio, for an improvement in "Processes for Reclaiming Vulcanized-Rubber Waste," an error appears in the printed specification requiring correction as follows: Page 1, line 17, strike out the words "and solution are then agitated" and insert the words and syllables *may be rendered more expedi-;* and that the said Letters Patent should be read with this correction therein that the same may conform to the record of the case in the Patent Office.

Signed and sealed this 21st day of May, A. D., 1912.

[SEAL.]

C. C. BILLINGS,
*Acting Commissioner of Patents.*